(12) United States Patent
Speight

(10) Patent No.: US 7,257,390 B2
(45) Date of Patent: Aug. 14, 2007

(54) TECHNIQUE FOR GENERATING AND MANAGING A PERSONAL DIALING QUEUE

(75) Inventor: Russell W. Speight, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 0 days.

(21) Appl. No.: 10/805,891

(22) Filed: Mar. 22, 2004

(65) Prior Publication Data

US 2005/0207560 A1 Sep. 22, 2005

(51) Int. Cl.
*H04M 11/10* (2006.01)
(52) U.S. Cl. .................. 455/412.1; 379/67.1
(58) Field of Classification Search ............ 455/412.1, 455/404.2, 456.1, 500; 379/218.01, 201.1
See application file for complete search history.

(56) References Cited

U.S. PATENT DOCUMENTS

| 5,943,410 A | 8/1999 | Shaffer et al. |
| 2003/0007627 A1 | 1/2003 | Elsey et al. |
| 2004/0029567 A1* | 2/2004 | Timmins et al. ......... 455/412.1 |
| 2005/0015307 A1* | 1/2005 | Simpson et al. ............. 705/26 |

* cited by examiner

*Primary Examiner*—Creighton Smith
(74) *Attorney, Agent, or Firm*—Kaye Scholer LLP

(57) ABSTRACT

An information assistance service is provided, which enables a user to generate a personal dialing queue containing multiple listings, and to call multiple parties listed in the personal dialing queue without the need to make additional requests for information assistance. In an illustrative embodiment, a request is received from a user for multiple listings representing parties that the user wishes to contact. In response, the operator conducts a search and generates a personal dialing queue that includes a list of telephone numbers, each associated with a respective party. A first telephone number is selected from the personal dialing queue, and a connection is established between the user and the first telephone number. Call status signals associated with the connection are monitored. When the called party disconnects, and the user remains on the line for a predetermined period of time, a second connection is made for the user to a second telephone number selected from the personal dialing queue. This process may repeat until the list of telephone numbers in the personal dialing queue is exhausted.

46 Claims, 8 Drawing Sheets

USER: MR. BARTOK

RESULTS OF SEARCH
ANNAPOLIS SHOES & BOOTS   555-555-3373
FREDDY'S                  555-555-1096
THE FOOTLOCKER            555-555-7932

| | VENDOR NAME (1851) | TELEPHONE NUMBER (1852) | SUCCESSFULLY CALLED ? (1853) |
|---|---|---|---|
| 1847 | ANNAPOLIS SHOES & BOOTS | 555-555-3373 | 0 |
| 1848 | FREDDY'S | 555-555-1096 | 0 |
| | THE FOOTLOCKER | 555-555-7932 | 0 |

LOGIN

PHONE NUMBER OR USERNAME ▭ ~501

PASSWORD ▭ ~504

[LOGIN] [HELP]

[SEARCH] [JAMES_] ~655

Folder Name

607 —◇ Company Contacts [View Contacts]

609 —◇ My Contacts [View Contacts] [Edit] [Delete]

[New Contacts Folder]

USER NAME: MR. BARTOK
FOLDER NAME: SHOE STORES

| NAME | NUMBER |
|---|---|
| ANNAPOLIS SHOES & BOOTS | 555-555-3373 |
| FREDDY'S | 555-555-1096 |
| THE FOOTLOCKER | 555-555-7932 |

SEARCH  JAMES_ ← 655

Folder Name

607 — ◇ Company Contacts    [View Contacts]
609 — ◇ My Contacts         [View Contacts] [Edit] [Delete]
610 — ◇ Shoe Stores         [View Contacts] [Edit] [Delete]

[New Contacts Folder]

TECHNIQUE FOR GENERATING AND MANAGING A PERSONAL DIALING QUEUE

FIELD OF THE INVENTION

The invention relates to a communications technique, and more particularly to an information assistance service for generating and managing contact information to facilitate a user's contacting desired parties.

BACKGROUND OF THE INVENTION

It is a common experience to use, e.g., a wireline telephone, a wireless telephone or other mobile device, to call an operator for information assistance. In a typical information assistance call, a caller identifies to the operator the name and address (sometimes city or area code) of a party whose telephone number is desired. In response, the operator locates the desired destination number using, e.g., a computer database. The caller may then be afforded an option to be connected to the destination number without the need of first terminating the information assistance call.

After exercising such an option, the user may be provided with enhanced information assistance services where the connection to the destination number may be monitored. Examples of such enhanced services are described, for instance, in U.S. Pat. No. 5,873,032 issued Feb. 16, 1999 to Cox et al. In accordance with one such enhanced service, when a busy or ring-no-answer condition is encountered in the connection to the destination number, a voice server intervenes, informs the user of the unsuccessful connection, and provides the user with a menu of options. A first option may be to receive the destination number in an automated voice by pressing a "2" key; a second option may be to return to an operator for further assistance by pressing a "*" key; etc.

SUMMARY OF THE INVENTION

Certain disadvantages associated with the prior art information assistance service have been recognized. For instance, the information (e.g., the desired destination number) provided by the prior art service to a user is on a call-by-call basis. That is, the prior art service fails to provide a user with access to the information previously requested by the user from earlier information assistance calls. In addition, if the user wants to record the information for future use which is provided by the prior art service, e.g., in automated voice, the user needs to record it by hand. This proves to be, at best, inconvenient for wireless telephone or mobile device users, especially for those who are driving.

The invention provides an improved system and method for providing information assistance to a user of a communication network. Accordingly, a record is generated that contains multiple listings, each representing a party that the user wishes to contact. This record is referred to as a "personal dialing queue." In accordance with the invention, when a call is received from a caller, which includes an information assistance request, a data search is conducted in response to the information assistance request. The aforementioned record (i.e., the personal dialing queue) is generated, which contains a plurality of telephone numbers resulting from the data search. The telephone numbers are associated with a plurality of entities, respectively. Before the caller's call is terminated, a first telephone number from the record is selected. A first communication is established by connecting the caller's call to the first telephone number.

If a predetermined call status condition relating to the first communication (e.g., call disconnection by a called party) is detected, a second telephone number from the record is selected. A second communication is then established by connecting the caller's call to the second telephone number. This process may repeat until the list of telephone numbers in the record is exhausted.

In accordance with an aspect of the invention, multiple telephone numbers are selected based on parameters specified by the user, and stored in the personal dialing queue. For example, the user may request a list of suggested toy stores, clothing stores, gas stations, ophthalmologists, or accountants, and their associated telephone numbers. In response, the operator conducts a search and generates a personal dialing queue that includes multiple listings that satisfy the user's request. Each listing may include a name of a respective party and an associated telephone number.

In accordance with another aspect of the invention, the listings in the personal dialing queue may be selected from one or more databases including, e.g., public national directory databases and other public directory databases, enterprise directory databases, etc. In an illustrative embodiment, the listings in the personal dialing queue may be selected from one or more folders in a private directory maintained for the user by the information assistance service.

In accordance with yet another aspect of the invention, the listings in the personal dialing queue may be prioritized based on one or more parameters, e.g., the level of sponsorship afforded by each respective party to the provider of the information assistance service, or the distance between the party and the user's present location.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

The invention is directed to a technique for providing an information assistance service to a user. In accordance with the invention, a file or record containing multiple listings, each containing contact information concerning a party with which the user wishes to communicate, is generated by the information assistance service. The file hereinafter may be referred to as a "personal dialing queue." The user may utilize the personal dialing queue to call multiple parties without the need to make additional information assistance requests.

For example, in one embodiment, the user may call an information assistance service provider and ask an operator to suggest a list of shoe stores where he/she may be able to purchase a particular type of shoe, and generate their associated contact information including, e.g., telephone numbers. In response, the operator conducts a search and generates a personal dialing queue that includes a list of telephone numbers, each associated with a respective shoe store. The listings in the personal dialing queue may be selected from one or more databases including, e.g., public national directory databases and other public directory databases, enterprise directory databases, etc.

A first telephone number is selected from the personal dialing queue, and the user is connected to the first telephone number. Call status signals associated with the connection are monitored. In one embodiment, when the destination party disconnects after a successful connection, and the user remains on the line for a predetermined period of time, a second telephone number is selected from the personal dialing queue, and the user is automatically connected thereto. This process may repeat until the list of telephone numbers in the queue is exhausted.

Figure 1:
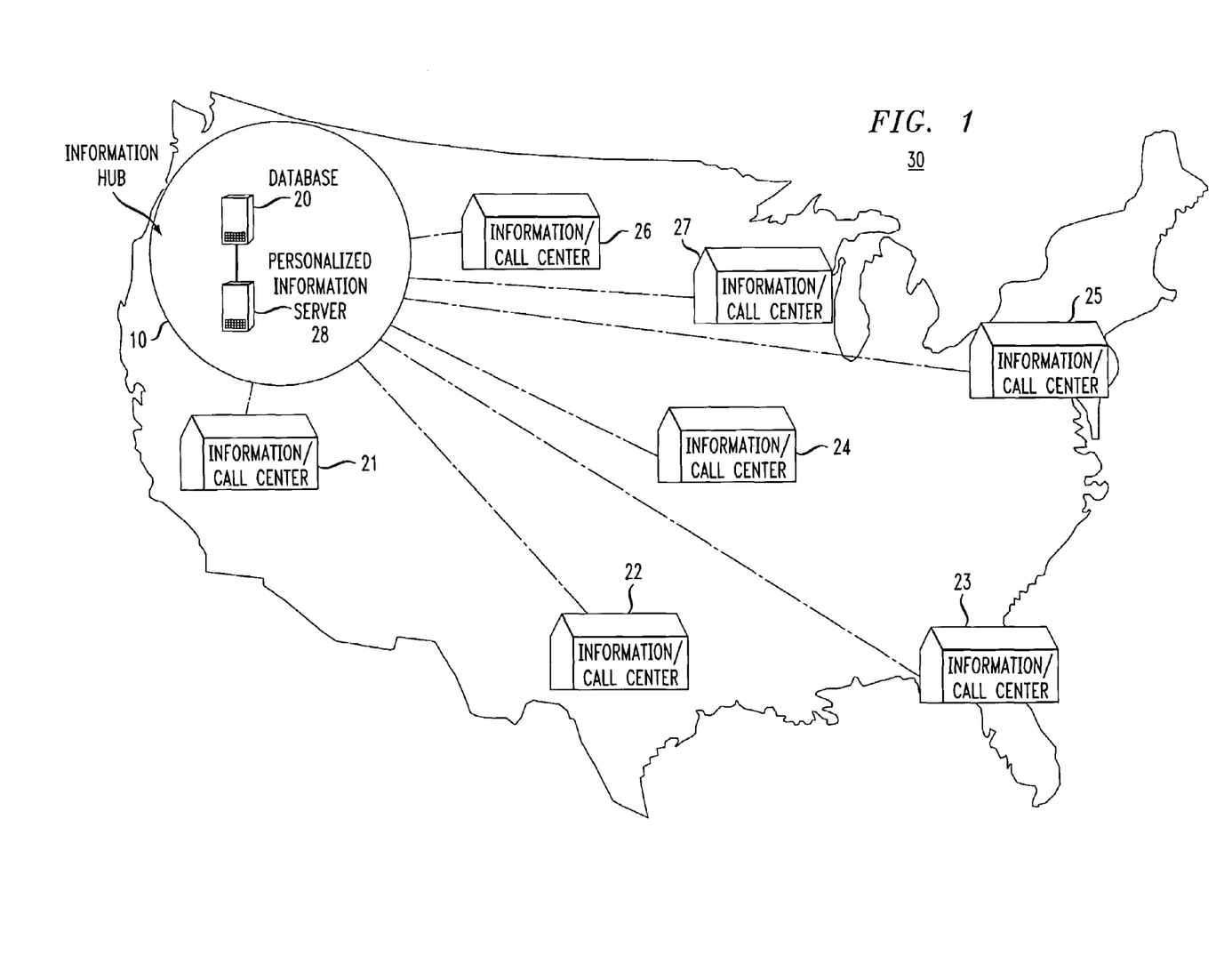
FIG. 1 illustrates a communications system including information/call centers in accordance with the invention.

FIG. 1 illustrates a communications system embodying the principles of the invention for providing an information assistance service, incorporating the inventive personal dialing queue concept. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. It should be noted that the term "operators" used herein broadly encompasses entities that are capable of providing assistance in a telecommunication environment, including without limitation human operators, voice response/recognition capabilities, web-/WAP-enabled operator services, and other automated and electronic access. Each of information/call centers 21 through 27 covers one or more regional coverage areas. One or more information hubs 10 are also included in WAN 30. An information hub 10 includes one or more personalized information servers 28 which are accessible by the operators in the system, and one or more databases 20 in which users' preference information, and private directories may be stored and maintained. Such information and directories may also be stored locally at one or more of the information/call centers.

An operator, as explained in more detail below, is generally provided with web browsing capabilities, telephone facilities as well as fully-featured operator user interface applications which facilitate the searching, retrieval and administering of database 20 through server 28. It is well understood that operators generally receive and respond to requests for directory assistance, information and communications services.

Figure 2A:
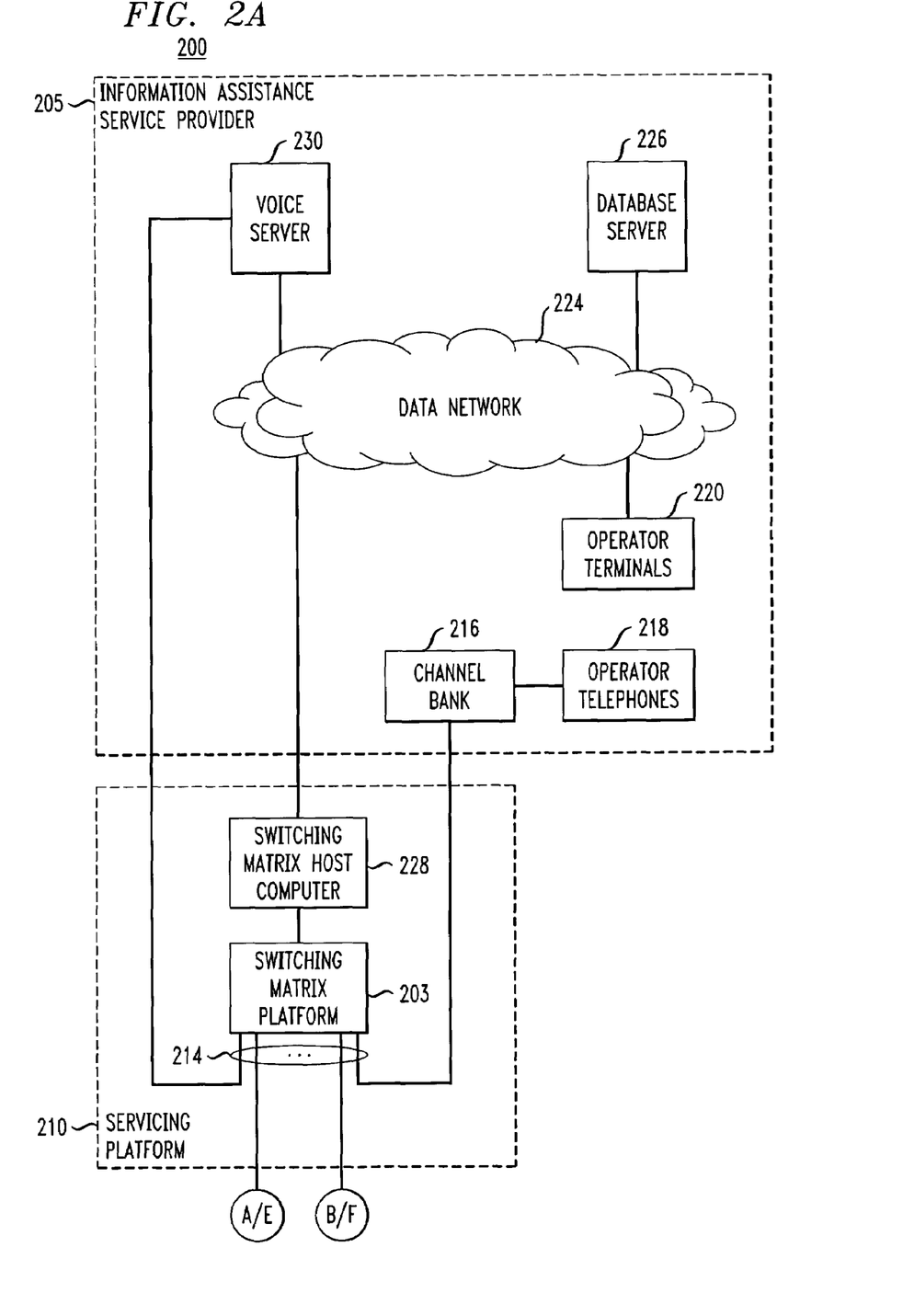
FIGS. 2A and 2B are block diagrams of components of the communications system of FIG. 1.
Figure 2B:
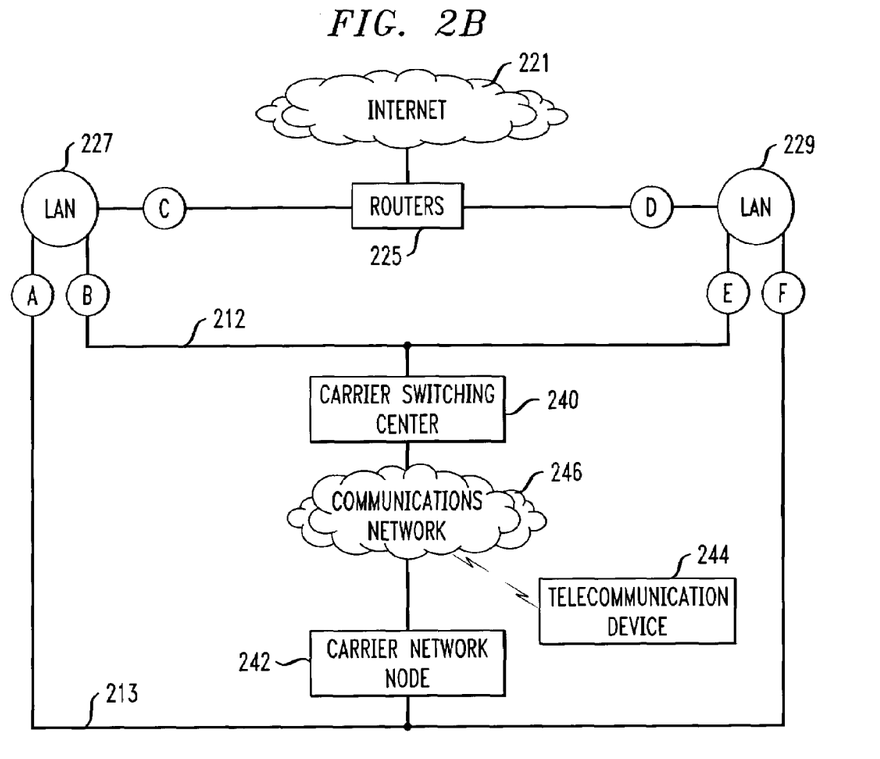

Referring to FIGS. 2A and 2B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area, or under the control or administration of the same entity. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 126 provides access to, among others, directory information from multiple sources. Database server 226 enables the operator to search directory information not just by name and address (sometimes city or area code) of a desired party, but also by type of goods/services and/or geographical region of a desired entity.

Data network 224 further connects to voice server 230, and switching matrix host computer 228, which in turn is connected to switching matrix platform 203 via a data link. Data network 224 includes, but is not limited to, local area network (LAN) 227, best seen in FIG. 2B. LAN 227 may connect to other similar remote LANs 229 to form WAN 30 in FIG. 1. LANs 227 and 229 are connected to one another and to Internet 221 via routers 225.

A user's telephone, computer, PDA or other telecommunication device 244 communicates via communications network 246 which is connected to carrier network node 242 and carrier switching center 240. T1 voice links 212 provide connection between the information/call center's switching matrix platform 203 and carrier's switching center 240, through which incoming information assistance calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component. If the outgoing call is being placed over a different network than that on which the incoming call was received, a second data connection to the outgoing network will be established.

The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on center 200 and platform 203 for each corresponding function.

Voice server 230 is connected via data network 224 to computer 228 (to which it acts as a slave processor) and via one or more T1 links to switching matrix platform 203. Each voice server 230 when more than one is employed in information/call center 200, connects to switching matrix platform 203 via a separate T1 link. Voice server 230 is employed to play the constantly repeated parts of an operator's speech, namely, the various greetings and signoffs (or closings), the caller's desired telephone number where requested, and possibly other information. At appropriate stages in a call progression, switch matrix host computer 228 initiates a voice path connection between voice server 30 and switching matrix platform 203 such that the user, or the user and the operator, are able to hear whatever pre-recorded speech is played on that connection by voice server 230. Computer 228 then instructs voice server 230, via data network 224, what type of message to play, and passes data parameters that enable voice server 230 to locate the message appropriate to the call state. Voice server 230 may also contain a voice recognition device for receiving verbal input from a party connected to the voice server.

Users of a particular telephone carrier may dial, speak or otherwise communicate predetermined access digits, access codes or retail numbers, or input a predetermined address or a URL established for information assistance by that company. The instant example assumes that the user dials, e.g., "411," "*555," "555-1212," "1-800-555-1212," "00," or other designated access numbers. The participating telephone company's own switching system will then reroute the call to information/call center 200 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes are utilized, such as skills-based routing or a priority scheme for preferred callers. The call queue is maintained by switching matrix host computer 228.

Personal Dialing Queue

In an illustrative embodiment of the invention, an operator receives from a user a request for suggested listings of goods/services providers. For example, the user who wants to purchase a particular type of shoe may request the operator to suggest appropriate shoe stores, and successively connect him/her to the suggested shoe stores by phone. In response to the request, one or more databases are searched, producing multiple listings satisfying the parameters specified by the user. The results are stored in a file or record referred to as a personal dialing queue. The personal dialing queue, which may be stored temporarily, e.g., in a memory in host computer 228, is maintained until the user terminates the current call. In accordance with the invention, computer 228 causes switching matrix platform 203 to establish an outbound connection to the telephone numbers successively selected from the personal dialing queue, and connects the user's call to the outbound connection to connect the user to the suggested shoe stores one by one.

Figure 3:
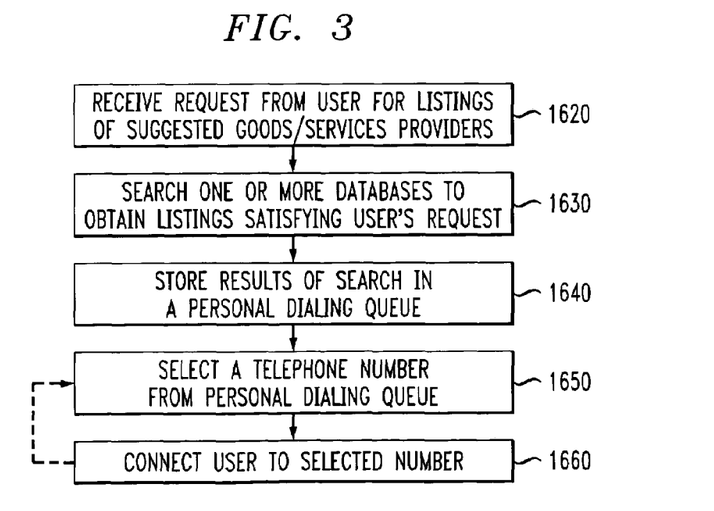
FIG. 3 is a flowchart depicting a routine for generating and utilizing a personal dialing queue.
Figure 4:
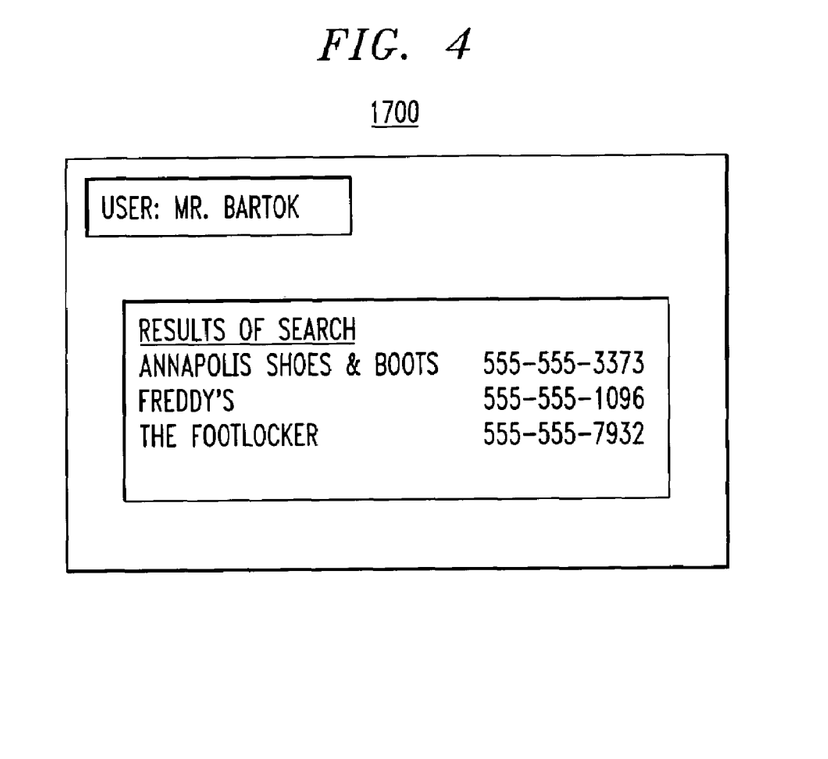
FIG. 4 illustrates a graphical user interface (GUI), containing results of a search, that may be displayed on an operator's terminal.

FIG. 3 is a flowchart depicting a routine for generating and utilizing a personal dialing queue, in accordance with this illustrative embodiment. At step 1620, a request is received from a user for a list of suggested goods/services providers satisfying one or more specified criteria. By way of example, suppose that a call is received from a user named Mr. Bartok, and that Mr. Bartok requests suggestions of shoe stores in Annapolis, Md. which sell boots. At step 1630, the operator searches one or more databases to obtain listings that satisfy Mr. Bartok's request. The operator may search, e.g., one or more public national directory databases and/or enterprise directory databases. The operator may also access, e.g., the Internet to obtain listings that satisfy Mr. Bartok's request. In one embodiment, the results of the search may be displayed on the operator's terminal. FIG. 4 illustrates a graphical user interface (GUI) 1700 that may be displayed on an operator's terminal and which includes several listings representing results of a search performed for Mr. Bartok. In this example, the list of results includes the names of several shoe stores, e.g., Annapolis Shoes & Boots, Freddy's, and The Footlocker, and their associated telephone numbers.

Figure 5:
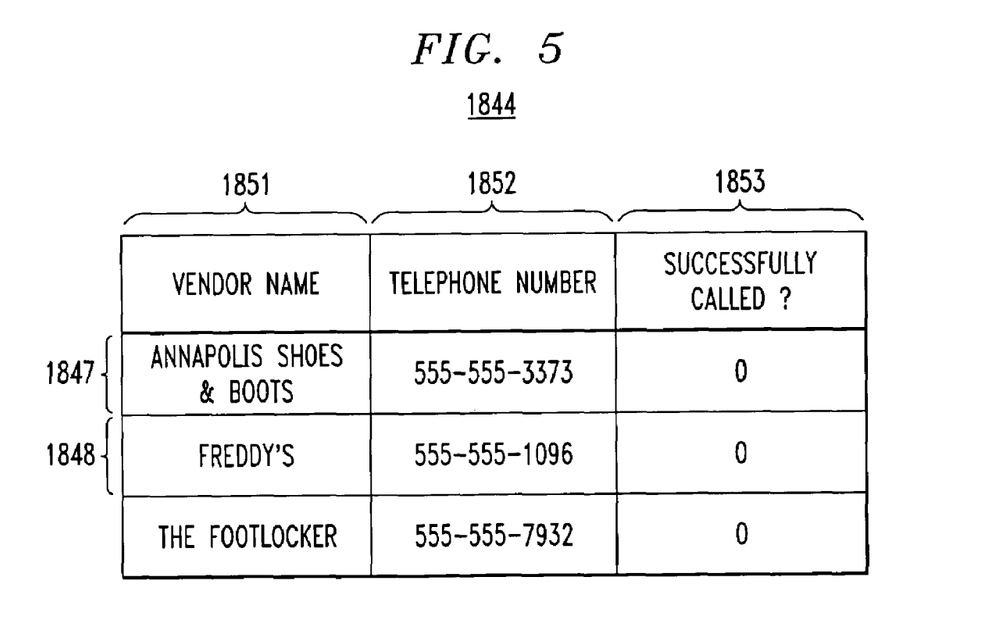
FIG. 5 illustrates a personal dialing queue that includes names and telephone numbers of several goods/services providers.

At step 1640, the results of the search are stored in a personal dialing queue maintained, e.g., by host computer 228. FIG. 5 illustrates a personal dialing queue 1844 that may be maintained for Mr. Bartok, and which contains the listings displayed on GUI 1700 (shown in FIG. 4). Personal dialing queue 1844 comprises three columns 1851-1853. Column 1851 includes a list of vendor names, e.g., Annapolis Shoes & Boots, Freddy's, and The Footlocker. Column 1852 contains a telephone number associated with each respective vendor name. Column 1853 includes, for each listing, a binary flag indicating whether a successful call (i.e., a call that was answered) has been made to the corresponding telephone number (binary flag="1") or not (binary flag="0"). In this example, each flag value in column 1853 is initially set to "0" since no calls have yet been made to any goods/services providers.

It should be noted that in this illustrative embodiment, the listings in personal dialing queue 1844 are in alphabetical order; however, in other embodiments, a personal dialing queue may be prioritized based on other parameters set by the user and/or the information assistance service provider. For example, the listings in a personal dialing queue may be prioritized based on the level of sponsorship provided by each respective goods/services provider, or based on agreements between the information assistance service provider and the goods/services providers. The information assistance service provider may invite goods/services providers to bid for priority of their listings in a personal dialing queue. A goods/services provider which pays a higher subscription fee to the service may be assigned a higher priority (and thus placed closer to the top of the queue) than those paying no or a lower subscription fee.

In another embodiment, listings in a personal dialing queue may be prioritized based on the distance between each respective goods/service provider and the user's present location. In this embodiment, the information assistance service provider may maintain a database containing global positioning system (GPS) coordinates for one or more goods/services providers that may appear in a listing of search results. Accordingly, when a call is received from a user, a signal representing the user's location information (e.g., GPS coordinates) is received from the user's telecommunications device 244, in accordance with the federal mandate of the "E911" initiative. Subsequently, when the user generates a personal dialing queue, the distance from the user to each of the goods/services providers (for which the GPS coordinates are known) is computed, and the goods/services providers are prioritized based on their distance from the user. If the GPS coordinates are known only for a portion of the goods/services providers included in the search results, these goods/services providers may be treated as a group, being placed in the personal dialing queue either before or after the providers for which no GPS data is known.

In this illustrative embodiment, a pointer is maintained that indicates which of the listings in personal dialing queue 1844 contains the most-recently dialed telephone number. The pointer may represent, e.g., a designated memory location within host computer 228. The practice of creating and maintaining a pointer is well-known. For example, the pointer may represent the memory address at which the listing containing the most-recently dialed telephone number is stored. Thus, this pointer may also be referred to as the "last call pointer." The last call pointer may be updated each time a telephone number is selected from personal dialing queue 1844 and dialed.

Returning to FIG. 3, at step 1650, computer 228 selects a telephone number from personal dialing queue 1844, and causes switching matrix platform 203 to connect the user's call to the selected telephone number, as indicated at step 1660. Computer 228 may select, e.g., the first telephone number in the personal dialing queue. In alternative embodiments, a telephone number from the personal dialing queue may be selected based on other parameters. In this illustrative example, Mr. Bartok is connected to the first number in personal dialing queue 1844, i.e., Annapolis Shoes & Boots.

Platform 203 establishes the an outbound connection to Annapolis Shoes & Boots by seizing an outgoing voice channel from a T1 communication link 214 and outdialing the desired telephone number. Outdialing is a function of platform 203, whereby platform 203 transmits the desired telephone number after it is entered. In this illustrative embodiment, after connecting Mr. Bartok to Annapolis Shoes & Boots, computer 228 may cause the last call pointer to be updated to indicate that Annapolis Shoes & Boots is the goods/services provider that was most recently called. Additionally (referring to personal dialing queue 1844 in FIG. 5), if the call to Annapolis Shoes & Boots is answered, the corresponding binary flag in column 1853 is changed to "1."

In accordance with a second aspect of the invention, if, after the user is connected to a telephone number listed in the personal dialing queue, either the call is not successful because of a busy signal, ring-no-answer condition or the like, or the call is successful (i.e., answered) and at a subsequent point the destination party disconnects, the user may return to the personal dialing queue and be connected to another vendor listed therein. Accordingly, steps 1650 and 1660 in the flowchart of FIG. 3 may be repeated indefinitely as long as the user wishes to continue contacting vendors that are listed in the personal dialing queue.

By way of example, suppose that the operator connects Mr. Bartok to the destination telephone number of Annapolis Shoes & Boots, as described above. Computer 228 is notified of the outgoing call and automatically instructs platform 203 to apply a CPA therein to the outbound connection and a DTMF receiver to the inbound connection after outdialing. Such a CPA is sensitive to, and capable of identifying, telephone connection status conditions and signals including ring tone, busy, reorder, PBX intercept, SIT intercept, vacant code, reorder-SIT, no circuit LEC, reorder-carrier, no circuit-carrier, dial tone, continuous on tone, and silence. Platform 203 afterwards connects Mr. Bartok on the inbound connection to the outgoing call on the outbound connection.

The CPA monitors the outgoing call on the outbound connection for a predetermined number of rings, a predetermined amount of time, or until a specified connection status is detected. The manner in which the outgoing call is treated depends on whether the call is successful (i.e., the call is answered), or not successful (i.e., a signal such as a busy signal, ring-no-answer, etc., is detected). Each possibility is discussed separately below.

In one embodiment, if the outgoing call is successful (i.e., the call is answered), one or more call status signals associated with the call are monitored. If, at a subsequent point, the destination telephone is disconnected, and the user remains on the line for a predetermined period of time after the called party disconnects, another telephone number is selected from the user's personal dialing queue, and the user is connected thereto.

Figure 6:
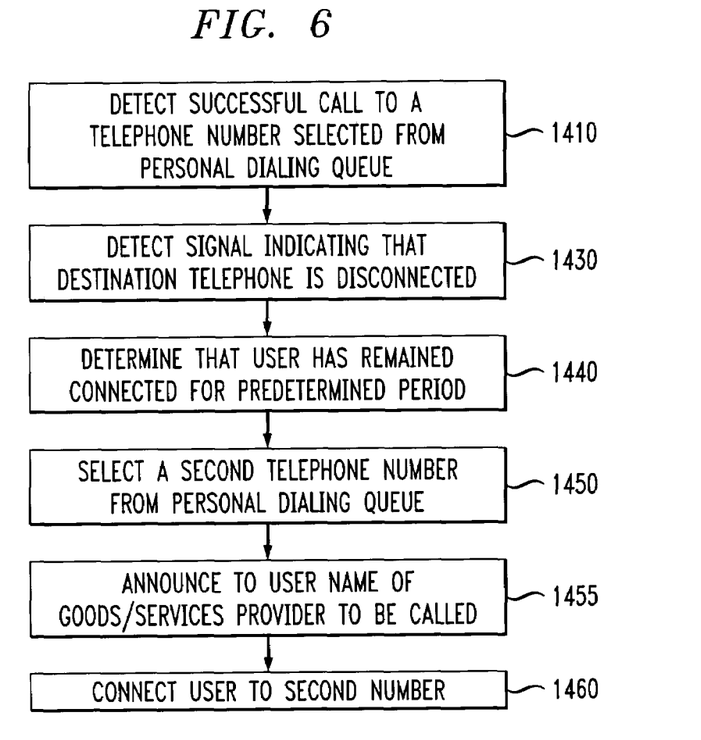
FIG. 6 is a flowchart depicting a routine for automatically connecting a user to a second telephone number selected from a personal dialing queue after the termination of a successful call to a first number.

FIG. 6 is a flowchart depicting a method for automatically connecting a user to a second telephone number selected from a personal dialing queue after the called party answers and disconnects the successful call. Referring to Mr. Bartok's personal dialing queue 1844 shown in FIG. 5, it is supposed that Mr. Bartok's call to Annapolis Shoes & Boots is successful, i.e., the call is answered by a person at Annapolis Shoes & Boots. At step 1410, the successful call is detected. In one embodiment, the CPA in platform 203 identifies the successful call by detecting, on the outbound connection, the bit transition that occurs when the destination telephone converts from an on-hook status to an off-hook status. The detection of the successful call is relayed to host computer 228 by platform 203.

In this embodiment, call status signals associated with the call are monitored. In this illustrative embodiment, when the outgoing call is successfully completed, platform 203 remains passively connected to the call. At step 1430, a signal is detected indicating that the destination telephone is disconnected. For example, when the destination telephone is disconnected, the CPA in platform 203 detects another bit transition indicating that the destination telephone changed from off-hook to on-hook.

It should be noted that if the user disconnects, whether before or after the called party disconnects, the user's call is torn down and the connection between the user and platform 203 is terminated. Additionally, if the user disconnects, the user's personal dialing queue is removed from memory in this illustrative embodiment.

However, in the instant example, Mr. Bartok remains on the line in order to be connected to another number from personal dialing queue 1844. Thus, at step 1440, a determination is made that Mr. Bartok has remained on the line for a predetermined period of time after the destination telephone disconnected. In response, at step 1450, computer 228 selects another telephone number from Mr. Bartok's personal dialing queue 1844.

In this illustrative embodiment, computer 228 selects the telephone number in personal dialing queue 1844 that immediately follows the most recently called number, indicated by the last call pointer. In this instance, the last call pointer indicates that Annapolis Shoes & Boots is the goods/services provider which was most recently called. Host computer 228 thus selects from personal dialing queue 1844 the listing which immediately follows the listing for Annapolis Shoes & Boots—in this case, Freddy's.

At step 1455, host computer 228 causes voice server 230 to announce the name of the goods/services provider to be called. In this example, voice server 230 may announce to Mr. Bartok, "You will now be connected to Freddy's." At step 1460, Mr. Bartok is connected to Freddy's. Host computer 228 updates the last call pointer to indicate that Freddy's is now the goods/services provider which was most recently called, and the binary flag associated with the Annapolis Shoes & Boots listing from "0" to "1."

Referring again to step 1660 of FIG. 3, if the aforementioned outgoing call cannot be successfully completed, e.g., the call status condition of the outgoing call identified by the CPA is a busy signal, platform 203 terminates the outgoing call by releasing the outbound channel, with the inbound channel intact. In this case, the routine returns to step 1650, another listing is selected from the personal dialing queue, and the user is informed of the name and telephone number of the next goods/services provider to be called. The user is then connected to the selected goods/services provider, and the last call pointer is updated. However, the binary flag associated with the Annapolis Shoes & Boots listing would remain to be "0," for which the listing may later be re-selected to attempt to connect the user to the number of Annapolis Shoes & Boots again.

The call status condition of the outgoing call detected by the CPA in platform 203 may be determined to be a ring-no-answer condition. Under that condition, it is desirable to allow sufficient time for the destination party to answer the call, but after a predetermined number of rings, the routine returns to step 1650, another listing is selected from the personal dialing queue, and the user is informed of the name and telephone number of the next goods/services provider to be called. The user is then connected to the selected goods/services provider, and the last call pointer is updated. However, the binary flag associated with the Annapolis Shoes & Boots listing would remain to be "0," for which the listing may later be re-selected to attempt to connect the user to the number of Annapolis Shoes & Boots again.

In the event that the call status condition of the outgoing call is identified as a communication problem, e.g., reorder, PBX intercept, SIT intercept, vacant code, reorder-SIT, no circuit LEC, reorder-carrier, no circuit-carrier, dial tone, continuous on tone, or silence, voice server 230 informs the user of the communication problem. The routine returns to step 1650, another listing is selected from the personal dialing queue, and the user is informed of the name and telephone number of the next goods/services provider to be called. The user is then connected to the selected goods/services provider, and the last call pointer is updated. However, the binary flag associated with the Annapolis Shoes & Boots listing would remain to be "0," for which the listing may later be re-selected to attempt to connect the user to the number of Annapolis Shoes & Boots again.

In an alternative embodiment, if, after the user is connected to a telephone number listed in the personal dialing queue, either the call is not successful because of a busy signal, ring-no-answer condition or the like, or the call is answered and at a subsequent point the called party disconnects, then the user is not automatically returned to the personal dialing queue. Instead, in this alternative embodiment, the user is given the option to return to the personal dialing queue, by, say, pressing a predetermined key on device 244. For example, voice server 230 may prompt the user as follows, "If you wish to be connected to another telephone number in your personal dialing queue, please press the # key. Otherwise, this call will be terminated." If the user presses the "#" key, another listing in the personal dialing queue is automatically selected, and the user is connected thereto.

In yet another embodiment, if, after the user is connected to a telephone number listed in the personal dialing queue, either the call is not successful because of a busy signal, ring-no-answer condition or the like, or the call is answered and at a subsequent point the destination party disconnects, then the user is presented with a menu of options. For example, in one embodiment, voice server 230 may present the following menu of options to the user:

Press:
"0" to return to an operator;
"1" to be connected to the next number in the personal dialing queue;
"2" to hear the listings in the personal dialing queue;
"3" to select a telephone number from the personal dialing queue;
"4" to re-prioritize the listings in the personal dialing queue; and
"5" to add a new listing to the personal dialing queue.

It should be noted that the options in the menu shown above are for illustrative purposes and should not be construed as limiting the scope of the invention. In alternative embodiments, other options may be presented to the user.

In this embodiment, the user may select one of the options provided by pressing the appropriate key on device 244. The depression of the key is ascertained when the DTMF signal associated with the key is detected by a DTMF signal detector in platform 203 onto which the user connection (also known as an "inbound connection") terminates.

Suppose that after Mr. Bartok's successful call to Annapolis Shoes & Boots, a on-hook signal is detected on the outbound connection indicating that the destination telephone is disconnected. In this embodiment, instead of being automatically connected to Freddy's, Mr. Bartok is presented with the menu of options presented above. If, in response, he presses "1," host computer 228 examines the last call pointer to determine which telephone number in personal dialing queue 1844 is the most recently dialed number. After determining that Annapolis Shoes & Boots is the most recently called vendor, host computer 228 selects the listing from the immediately following row in personal dialing queue 1844 (which in this instance is Freddy's), and connects Mr. Bartok thereto. Specifically, an outgoing voice channel is seized from a T1 communication link 214 and the number is outdialed. Host computer 228 additionally adjusts the last call pointer to reflect the new call.

If Mr. Bartok presses "2," host computer 228 causes voice server 230 to read the names and associated telephone numbers from the listings in personal dialing queue 1844. In one embodiment, Mr. Bartok may be given the option of returning at any time to the main menu by pressing a predetermined key on device 244.

If Mr. Bartok presses "3," he is prompted to provide additional information identifying the telephone number that he or she wishes to select. For example, in one embodiment, voice server 230 may prompt Mr. Bartok with the following request, "Please enter the first five letters of the party's name." After Mr. Bartok enters an amount of information sufficient for host computer 228 to match his selection with a listing in personal dialing queue 1844, the corresponding telephone number is retrieved from the personal dialing queue, and Mr. Bartok is connected thereto.

If Mr. Bartok presses "4," host computer 228 allows Mr. Bartok to re-prioritize the listings in the personal dialing queue 1844. For example, Mr. Bartok may be allowed to re-prioritize the listings based on the distance between each respective goods/services provider and Mr. Bartok's present location. A method for prioritizing listings in a personal dialing queue based on an associated distance is described above. In alternative embodiments, a user may be provided options to re-prioritize the listings based on other parameters. For example, in one embodiment, a user may cause the listings in a personal dialing queue to be re-prioritized based on whether or not each listed goods/services provider has been successfully called. For example, referring to personal dialing queue 1844, host computer 228 may assign listings having the associated flag="1" in column 1853 a lower priority than listings having the associated flag="0" in column 1853, allowing the user to focus on those goods/services providers which he/she has not yet contacted.

Suppose that Mr. Bartok, while conversing with a salesperson at Annapolis Shoes & Boots about the particular type of boot for which he is looking, is informed by the salesperson that such type of boot may be available at Big Billy Bob's Boots, and that the telephone number for Big Billy Bob's Boots is 555-555-9909. Suppose further that Mr. Bartok wishes to add a listing for Big Billy Bob's Boots to his personal dialing queue 1844. Accordingly, Mr. Bartok may select option "5" from the menu.

After Mr. Bartok presses "5," host computer 228, in response, causes voice server 230 to prompt Mr. Bartok to enter the name and telephone number of the new goods/services provider. In one embodiment, this may require multiple prompts. For example, voice server 230 may first request, "Please enter the name of the party and press the # key." After Mr. Bartok provides the name "Big Billy Bob's Boots" by pressing the corresponding keys on device 244 (or by uttering the name which is recognized by a voice recognition device in voice server 230), voice server 230 may request, "Please enter the telephone number and then press the # key." After Mr. Bartok provides the telephone number of Big Billy Bob's Boots, host computer 228 may store the name and number as a new listing in personal dialing queue 1844. In one embodiment, after entering the new telephone number, Mr. Bartok is automatically connected thereto; alternatively, Mr. Bartok may be returned to the menu of options.

In this embodiment, if Mr. Bartok presses "0," he is connected to an operator. The operator may further assist Mr. Bartok with the shoe shopping or other information requests.

Private Directory Service

In another embodiment of the invention, a user's personal dialing queue may be stored for future use in a folder within a private directory associated with the user. In this embodiment, a private directory service is made available to the user to permit the user to create and maintain one or more contacts folders for storing selected information such as, e.g., names and telephone numbers. In this embodiment, a user's contacts folders may be stored in database 20. Such folders may also be stored locally at one or more of the information/call centers.

A user may maintain contacts folders for different purposes. For example, the user may include a personal contacts folder containing personal directory information, and a business contacts folder containing business directory information. In one embodiment, a contacts folder may be created and maintained (1) through the Internet or other network or communications means directly, and/or (2) through an operator indirectly, and/or (3) using a personal information manager (PIM), which may include, e.g., a hand-held device such as a personal digital assistants (PDA) or a wireless communicator. An implementation of one such private directory service is described in co-pending, commonly assigned U.S. patent application Ser. No. 10/190,782, filed on Jul. 8, 2002, which is hereby incorporated by reference in its entirety.

Figure 7:
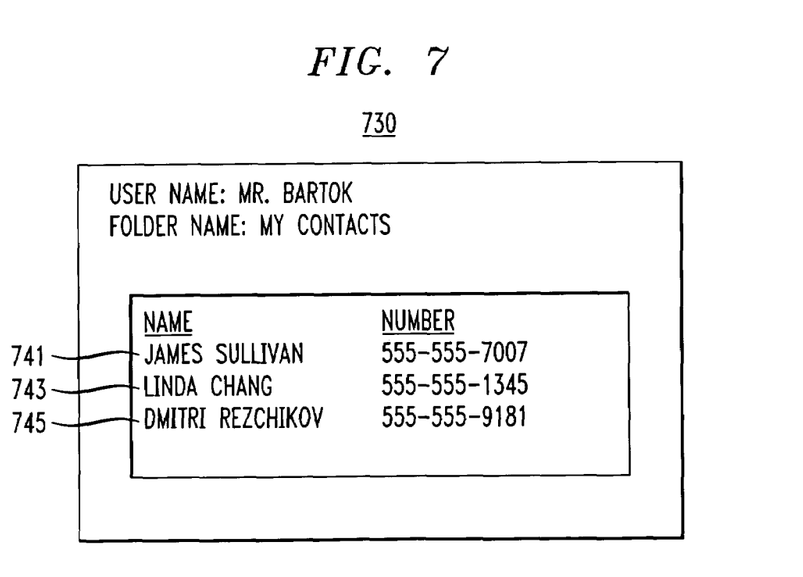
FIG. 7 illustrates a contacts folder that may be maintained in a private directory.

In case (2) above, the user may access a contacts folder through communications with an operator at an information/call center via telecommunication media, e.g., wireless telephone, wireline telephone, voice over Internet protocol (VoIP), PDA, VPN, etc. By way of example, suppose that Mr. Bartok is a subscriber to the private directory service to store the names and telephone numbers of one or more family members, friends, colleagues, etc. FIG. 7 shows a folder 730 that may be maintained by Mr. Bartok for this purpose. Folder 730 is named "My Contacts," and includes listings for James Sullivan (row 741), Linda Chang (row 743), and Dmitri Rezchikov (row 745).

In one embodiment, a user who subscribes to the above-described private directory service may, after generating a personal dialing queue, choose to store the personal dialing queue in a folder within his or her private directory. In this embodiment, when the user's call is first received, host computer 228 may determine from the user's ANI that he/she maintains a private directory. The above-described menu of options may be modified to also include "Press '7' to store the personal dialing queue in the private directory." Suppose that Mr. Bartok finds the listings in the personal dialing queue useful, and may want to refer to some or all of the listings in the future, Mr. Bartok at one point presses "7" when he is presented with the menu options.

Figure 8:
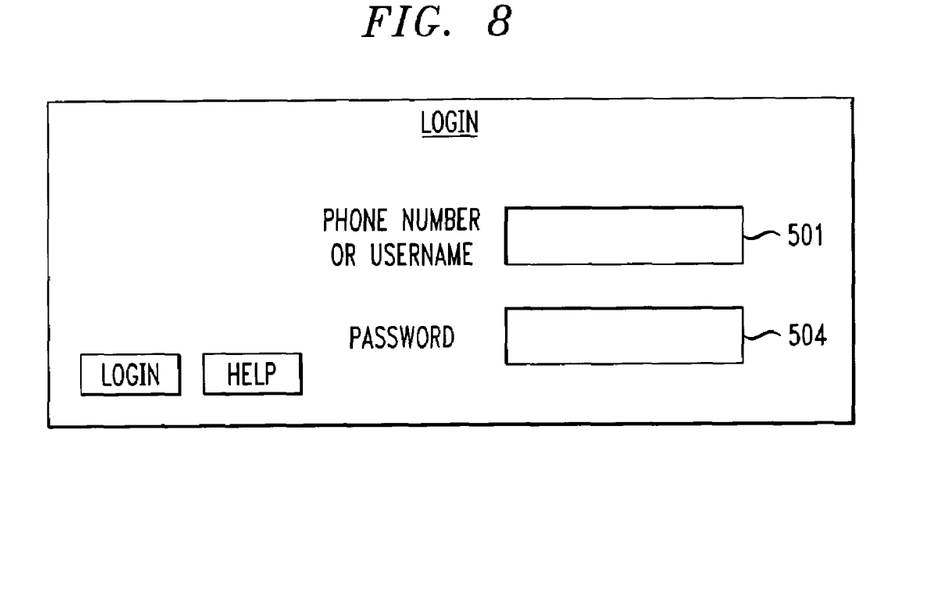
FIG. 8 illustrates a Login graphical user interface (GUI) for providing a personal directory service.

In this illustrative embodiment, after Mr. Bartok presses "7" to express his desire to store personal dialing queue 1844 in his private directory, computer 228 invokes assistance of an operator. Server 28 then presents the operator with a Login graphical user interface (GUI) on terminal 120. FIG. 8 illustrates such a Login GUI where the operator is prompted to enter the phone number or to identify the user, and a password to verify that the user is authorized to access the private directory service. It will be appreciated that other user identifying information, e.g., a personal identification number (PIN), his/her mother's maiden name, etc. may be used for verification purposes as well.

It should be noted at this point that the user identification and password are established beforehand through a registration process. For example, to subscribe to the private directory service, a user can call an operator at the designated access number. As part of the registration, the operator enters at a user data web page on server 28 the user identifying information including username, password, and telephone number of the particular telecommunication device, e.g., a wireless telephone in this instance, which the user would use to call the information assistance service in the future. It is particularly advantageous to use such a phone number (also known as a mobile directory number (MDN) in the case of a wireless phone number) to identify the user since, as described before, the calling number would be automatically captured as an ANI at information/call center 200 when the user calls.

Thus, the ANI of the user is automatically provided in entry 501 of the Login GUI by server 28, thereby obviating the need of the operator's eliciting from the user, and entering, the required phone number or username. (In the event that such an ANI is not automatically available, or where the user is accessing the subject service from an unknown point or the operator suspects that the user calls from a phone number other than the registered phone number, the operator may verify/obtain the necessary identifying information with/from the user.) At entry 504, the operator enters the password provided by the user to complete the login process. The login information is then transmitted to server 28, where it checks the aforementioned user data web page to verify the received ANI and password. After they are verified, server 28 identifies from the user data web page all of the folders including, e.g., contacts folders, associated with the received ANI, and any user's access rights thereto. For example, for each folder, the user may have the predesignated rights to view, edit, administer, and/or delete the folder. Server 28 presents to terminal 120 a Home GUI, listing all such folders associated with the ANI and thus the user.

Figure 9:
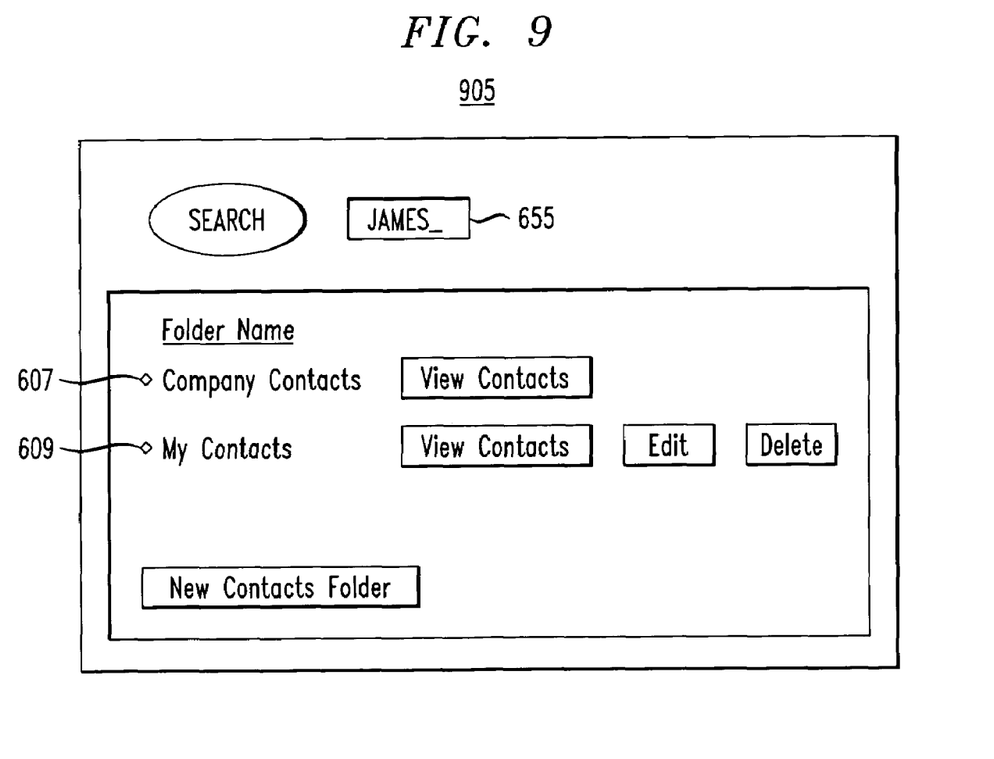
FIG. 9 illustrates a Home GUI for providing a private directory service.

FIG. 9 illustrates such a Home GUI 905 which may be presented to the operator who is assisting Mr. Bartok. In this example, Home GUI 905 includes rows 607 and 609, representing a "Company Contacts" folder and a "My Contacts" folder, respectively. In this example, row 609 represents Mr. Bartok's "My Contacts" folder 730 shown in FIG. 7. The operator can access each contacts folder, and manage the contacts information in the folder for the user, subject to the user's access rights thereto. For example, Mr. Bartok in this instance has the predesignated right only to view the content of the Company Contacts folder represented by row 607. On the other hand, referring to row 609, he has the additional rights to edit and/or delete the content of My Contacts folder 730.

Figure 10:
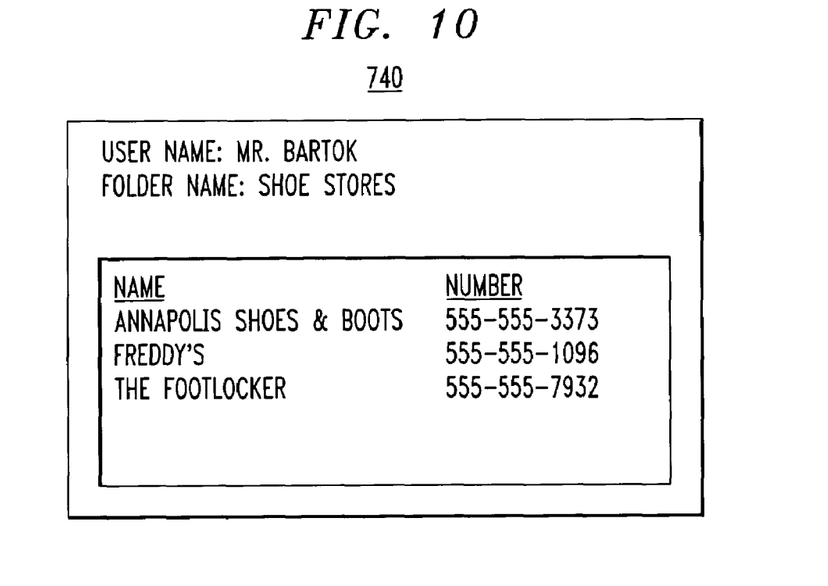
FIG. 10 illustrates a contacts folder that contains the listings from personal dialing queue.

Continuing the above example where Mr. Bartok wishes to store personal dialing queue 1844 in his private directory, the operator asks him to provide a name for a new folder to contain the listings in queue 1844. Mr. Bartok chooses, say, "Shoe Stores" as a name for the new folder. Accordingly, the operator creates a new contacts folder called "Shoe Stores," and stores the listings from personal dialing queue 1844 in the new folder. FIG. 10 shows a contacts folder 740, named "Shoe Stores," that contains the listings from personal dialing queue 1844.

Figure 11:
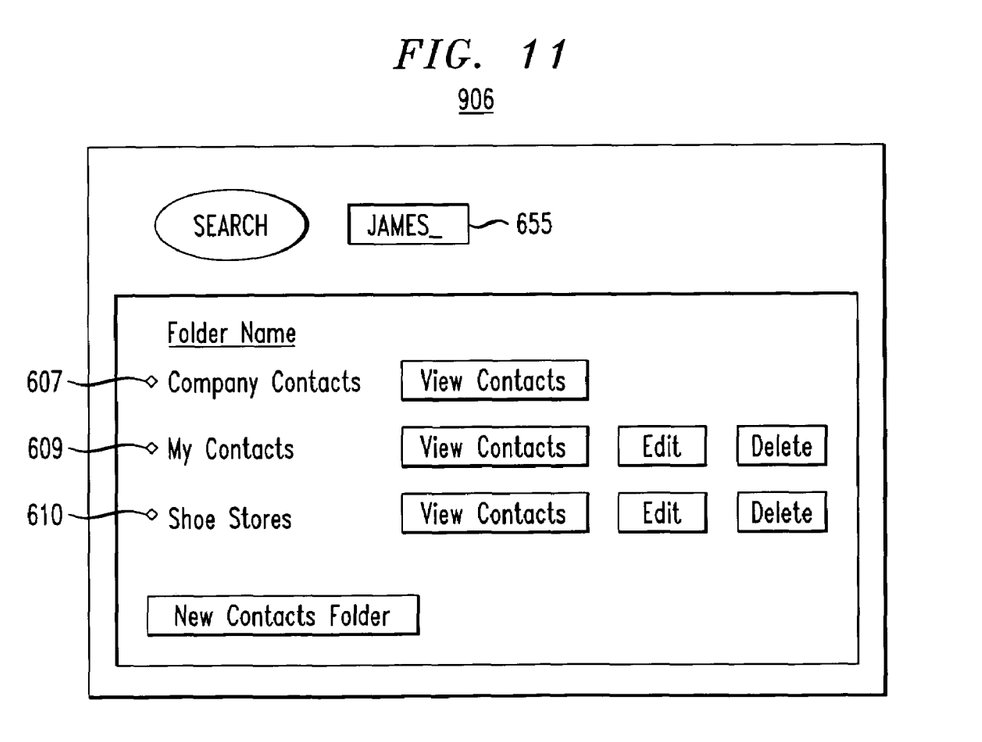
FIG. 11 illustrates a second Home GUI for providing a private directory service.

Home GUI 905 is then updated to reflect the creation of "Shoe Stores" folder 740. FIG. 11 shows Home GUI 906 in which row 610 is added to represent "Shoe Stores" folder 740. Mr. Bartok has the right to view, edit or delete the contents of "Shoe Stores" folder 740.

It should be pointed out that a search engine is provided on a Home GUI (e.g., 906) to search in one or more contacts folders for a listing of a desired contact. For example, the operator may specify at entry 655 a search term (e.g., James). Thus, by using such a search engine, an informal request without much information, such as "I need to reach James" and "I want to talk to the sales manager at ABC Corporation" may be sufficient for the operator to locate the requested contact information in a contacts folder. After initiating the search by clicking on the "Search" button, any listing satisfying the search query is highlighted. In this instance, a search on the name "James" uncovers listing 741 in "My Contacts" folder 730 (shown in FIG. 7).

In one embodiment, if the requested name is not found within the user's private directory, the operator may elicit from the user more specific data about the desired contact, e.g., James's full name, and also search other databases in case the desired contact information cannot be found in any contacts folders associated with the user. Such other databases may include public national directory databases and other public directory databases, enterprise directory databases (e.g., corporation directory databases, and university directory databases), etc., accessible by database server 226.

In one embodiment, an operator receives from a user multiple names, and a request for the associated telephone numbers. The names may include, e.g., individuals, companies, public agencies, etc. In response to the request, the operator may search for the desired listings in one or more contacts folders in the user's personal directory. The operator may additionally search for the desired listings in other databases, including, e.g., public directory databases, enterprise directory databases, etc. The results are stored in a personal dialing queue as described above.

Figure 12:
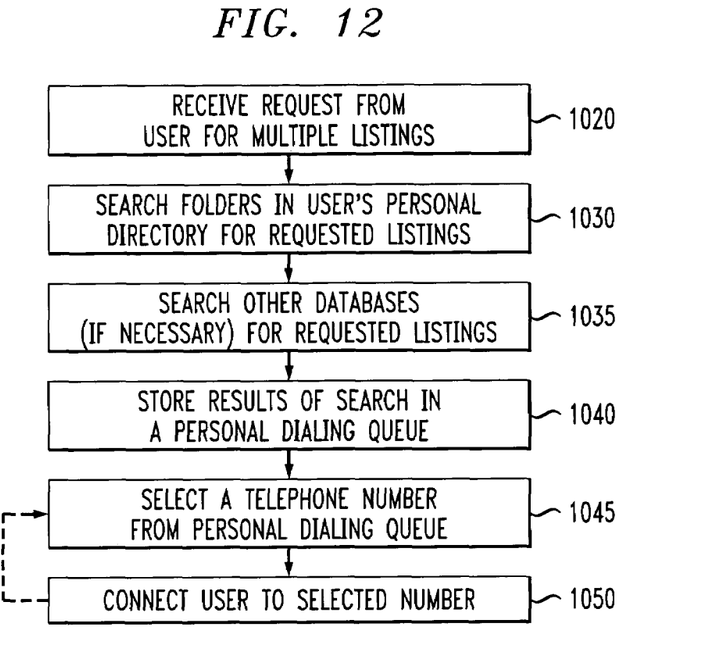
FIG. 12 is a flowchart depicting a routine for generating a personal dialing queue based on a search of one or more contacts folders in a user's personal directory.
Figure 13:
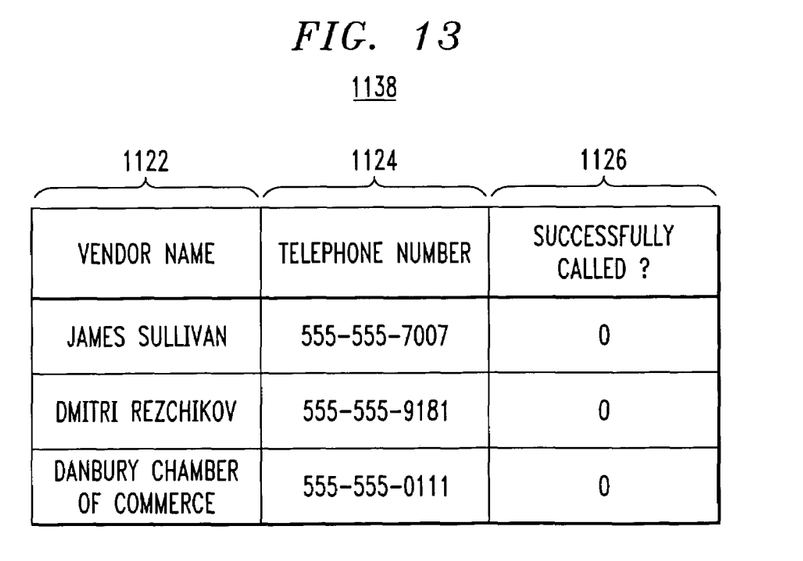
FIG. 13 illustrates a second personal dialing queue.

FIG. 12 is a flowchart depicting a method for generating a personal dialing queue based on a search of one or more folders in a user's personal directory. For illustrative purposes, suppose that a call is received from Mr. Bartok, and that Mr. Bartok informs the operator, "I would like to speak to James Sullivan, then with Dmitri, and then I want to call the Danbury Chamber of Commerce." After Mr. Bartok's request is received (step 1020), the operator, at step 1030, searches within Mr. Bartok's private directory to find the requested listings. In the instant case, a search of his private directory finds both James Sullivan and Dmitri Rezchikov within Mr. Bartok's "My Contacts" folder 730. However, the search fails to uncover a listing for the Danbury Chamber of Commerce. Accordingly, at step 1035, the operator searches other databases such as, e.g., one or more public directory databases, enterprise directory databases, etc., to obtain a listing for the Danbury Chamber of Commerce. When such a listing is found, the accumulated results of the operator's various searches are stored in a personal dialing queue (step 1040). FIG. 13 shows a personal dialing queue 1138 containing the listings found in response to Mr. Bartok's request. Personal dialing queue 1138 includes the names and telephone numbers of James Sullivan, Dmitri Rezchikov, and the Danbury Chamber of Commerce, in that order.

At step 1045, computer 228 selects a telephone number from personal dialing queue 1138. In this instance, computer 228 selects James Sullivan's telephone number. Computer 228 causes switching matrix platform 203 to connect Mr. Bartok's call to the selected number, as indicated at step 1050. After Mr. Bartok is connected to James Sullivan, the call is handled in the manner previously described.

In an alternative embodiment, a user may inform the operator that he/she wishes to be connected simultaneously to more than one of the parties listed in the personal dialing queue. For example, in this example, Mr. Bartok may tell the operator that he wishes first to arrange a conference call with James Sullivan and Dmitri Rezchikov, and then call the Danbury Chamber of Commerce. Accordingly, computer 228 is programmed to retrieve the appropriate telephone numbers from personal dialing queue 1844, and establishes connections with James Sullivan and Dmitri Rezchikov, respectively, to realize the conference call. Subsequently, after James Sullivan and Dmitri Rezchikov disconnect, Mr. Bartok is connected automatically to the Danbury Chamber of Commerce.

The foregoing merely illustrates the principles of the invention. It will thus be appreciated that those skilled in the art will be able to devise numerous other arrangements which embody the principles of the invention and are thus within its spirit and scope.

For example, information/call center 200 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing an information assistance service, comprising:

receiving, by an information assistance provider, a call from a caller, the call including at least one criterion and a request that the information assistance provider identify one or more entities satisfying the at least one criterion;

conducting a data search, based on the at least one criterion, in response to the information assistance request;

generating a record which contains a plurality of telephone numbers resulting from the data search, the telephone numbers being associated with a plurality of entities, respectively; and repeating the following (a) through (e) one or more times before the caller's call is terminated:
(a) selecting a first telephone number from the record;
(b) establishing a first communication by connecting the caller's call to the first telephone number;
(c) detecting a predetermined call status condition relating to the first communication;
(d) in response to the predetermined call status condition, selecting a second telephone number from the record different from the first telephone number; and
(e) establishing a second communication by connecting the caller's call to the second telephone number.

2. The method of claim 1, wherein the request includes a request for suggesting providers of a product or service desired by the caller.

3. The method of claim 1, wherein the plurality of entities include providers of a product or service desired by the caller.

4. The method of claim 1, wherein the plurality of entities include individuals.

5. The method of claim 1, wherein the data search includes a search of a directory associated with the caller.

6. The method of claim 1, wherein at least one of the telephone numbers in the record is assigned a priority based on a distance between the caller and the entity associated with the at least one telephone number.

7. The method of claim 1, wherein the predetermined call status condition includes an indication that the first communication is disconnected by a called entity associated with the first telephone number.

8. The method of claim 1, wherein the predetermined call status condition includes a busy condition.

9. The method of claim 1, wherein the predetermined call status condition includes a ring-no-answer condition.

10. The method of claim 1, wherein the predetermined call status condition includes a communication problem.

11. The method of claim 1, wherein at least part of content of the record is stored in a folder associated with the user after the caller's call is terminated.

12. A method for providing an information assistance service, comprising:
receiving a call from a caller, the call including an information assistance request;
conducting a data search in response to the information assistance request; generating a record which contains a plurality of telephone numbers resulting from the data search, the telephone numbers being associated with a plurality of entities, respectively;
establishing communications connecting the caller's call to two or more of the telephone numbers in the record in accordance with a call pattern before a termination of the caller's call; and
allowing the caller to manipulate the call pattern.

13. The method of claim 12, wherein the call pattern specifies that the communications are established in a successive manner.

14. The method of claim 12, wherein the call pattern specifies that at least two of the communications overlap in time.

15. The method of claim 12, wherein the caller is allowed to re-arrange the order of the communications to manipulate the call pattern.

16. The method of claim 12, wherein the information assistance request includes a request for suggesting providers of a product or service desired by the caller.

17. The method of claim 12, wherein the plurality of entities include providers of a product or service desired by the caller.

18. The method of claim 12, wherein the plurality of entities include individuals.

19. The method of claim 12, wherein the data search includes a search of a directory associated with the caller.

20. The method of claim 12, wherein the call pattern is designed based on relative distances between the caller and the entities associated with the two or more telephone numbers.

21. The method of claim 12, wherein the call pattern is designed based on relative compensations by the entities associated with the two or more telephone numbers to a provider of the information assistance service.

22. The method of claim 12, wherein at least part of content of the record is stored in a folder associated with the user after the caller's call is terminated.

23. The method of claim 12, further comprising allowing the caller to insert contact information concerning a desired party in the record.

24. A system for providing an information assistance service, comprising:
an interface for receiving a call from a caller, the call including an information assistance request, a data search being conducted in response to the information assistance request; and
a processor for generating a record which contains a plurality of telephone numbers resulting from the data search, the telephone numbers being associated with a plurality of entities, respectively, communications being established which connect the caller's call to two or more of the telephone numbers in the record in accordance with a call pattern before a termination of the caller's call, the caller being allowed to manipulate the call pattern.

25. The system of claim 24, wherein the call pattern specifies that the communications are established in a successive manner.

26. The system of claim 24, wherein the call pattern specifies that at least two of the communications overlap in time.

27. The system of claim 24, wherein the caller is allowed to re-arrange the order of the communications to manipulate the call pattern.

28. The system of claim 24, wherein the information assistance request includes a request for suggesting providers of a product or service desired by the caller.

29. The system of claim 24, wherein the plurality of entities include providers of a product or service desired by the caller.

30. The system of claim 24, wherein the plurality of entities include individuals.

31. The system of claim 24, wherein the data search includes a search of a directory associated with the caller.

32. The system of claim 24, wherein the call pattern is designed based on relative distances between the caller and the entities associated with the two or more telephone numbers.

33. The system of claim 24, wherein the call pattern is designed based on relative compensations by the entities associated with the two or more telephone numbers to a provider of the information assistance service.

34. The system of claim 24, wherein the caller is allowed to insert contact information concerning a desired party in the record.

35. A method for providing an information assistance service, comprising:
receiving a call from a caller, the call including an information assistance request;
conducting a data search in response to the information assistance request;
generating a record which contains a plurality of telephone numbers resulting from the data search, the telephone numbers being associated with a plurality of entities, respectively;
assigning a priority to at least one of the telephone numbers in the record; and
establishing communications connecting the caller's call to two or more of the telephone numbers in the record in accordance with the priority before a termination of the caller's call; and
allowing the caller to re-arrange the order of the communications by changing the priority.

36. The method of claim 35, comprising:
assigning a priority to at least one of the telephone numbers in the record based on a distance between the caller and the entity associated with the at least one telephone number.

37. The method of claim 35, comprising:
assigning a priority to at least one of the telephone numbers in the record based on a compensation by the entity associated with the at least one telephone number to a provider of the information assistance service.

38. A method for providing an information assistance service, comprising:
receiving a call from a caller, the call including an information assistance request;
conducting a data search in response to the information assistance request;
generating a record which contains a plurality of telephone numbers resulting from the data search, the telephone numbers being associated with a plurality of entities, respectively;
establishing communications connecting the caller's call to two or more of the telephone numbers in the record in accordance with a call pattern before a termination of the caller's call; and
allowing the caller to re-arrange the order of the communications to manipulate the call pattern.

39. A system for providing an information assistance service, comprising:
an interface configured to:
receive a call from a caller, the call including an information assistance request, a data search being conducted in response to the information assistance request; and
a processor configured to:
generate a record which contains a plurality of telephone numbers resulting from the data search, the telephone numbers being associated with a plurality of entities, respectively;
establish communications connecting the caller's call to two or more of the telephone numbers in the record in accordance with a call pattern before a termination of the caller's call; and
allowing the caller to re-arrange the order of the communications to manipulate the call pattern.

40. The method of claim 1, comprising:
selecting automatically the first telephone number from the record; and
establishing automatically the first communication by connecting the caller's call to the first telephone number.

41. The method of claim 40, comprising:
in response to the predetermined call status condition, selecting automatically the second telephone number from the record; and
establishing automatically the second communication by connecting the caller's call to the second telephone number.

42. The method of claim 1, comprising:
in response to the predetermined call status condition, selecting automatically the second telephone number from the record; and
establishing automatically the second communication by connecting the caller's call to the second telephone number.

43. A method for providing an information assistance service, comprising:
receiving a call from a caller, the call including an information assistance request;
conducting a search of a database not associated with the caller, in response to the information assistance request;
generating a record which contains a plurality of telephone numbers resulting from the search, the telephone numbers being associated with a plurality of independent entities, respectively; and
establishing communications connecting the caller's call to two or more of the telephone numbers in the record before a termination of the caller's call.

44. The method of claim 1, comprising:
generating a record containing a plurality of telephone numbers resulting from the data search and meeting the criterion, the telephone numbers being associated with a plurality of entities, respectively.

45. The method of claim 44, wherein the telephone numbers are associated with a plurality of independent entities.

46. A method for providing an information assistance service, comprising:
receiving a call from a caller, the call including an information assistance request;
conducting a data search in response to the information assistance request;
generating a record containing a plurality of telephone numbers resulting from the data search, the telephone numbers being associated with a plurality of entities, respectively, wherein at least one of the telephone numbers in the record is assigned a priority based on a compensation by the entity associated with the at least one telephone number to a provider of the information assistance service; and
repeating the following (a) through (e) one or more times before the caller's call is terminated:
(a) selecting a first telephone number from the record;
(b) establishing a first communication by connecting the caller's call to the first telephone number;
(c) detecting a predetermined call status condition relating to the first communication;
(d) in response to the predetermined call status condition, selecting a second telephone number from the record; and
(e) establishing a second communication by connecting the caller's call to the second telephone number.

* * * * *